UNITED STATES PATENT OFFICE.

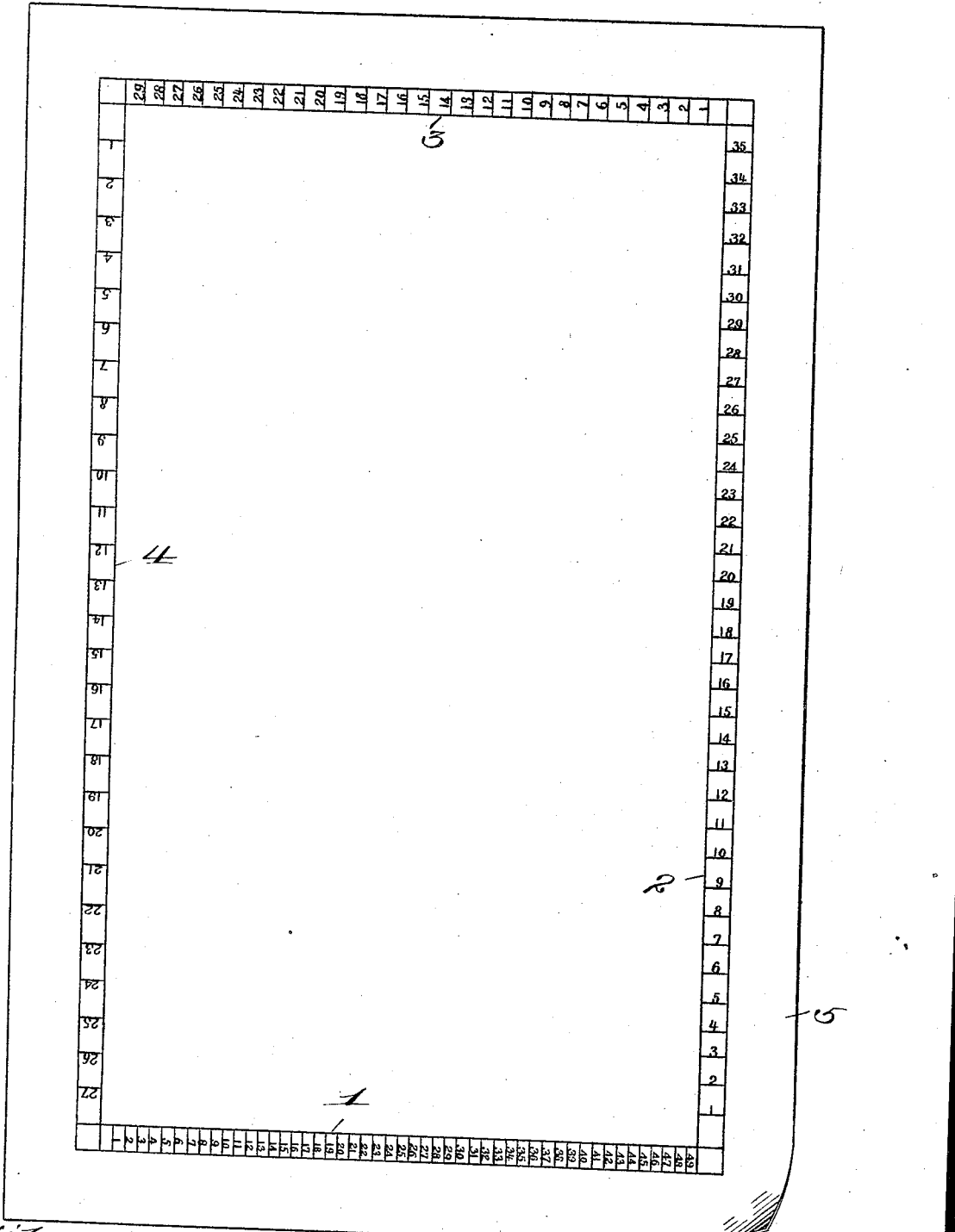

NELSON M. BLAIR, OF NEW ORLEANS, LOUISIANA.

PROPORTIONAL SCALE.

946,483.  Specification of Letters Patent.  Patented Jan. 11, 1910.

Application filed April 19, 1909. Serial No. 490,844.

*To all whom it may concern:*

Be it known that I, NELSON M. BLAIR, a citizen of the United States, residing at New Orleans, in the parish of Orleans, State of Louisiana, have invented certain new and useful Improvements in Proportional Scales, of which the following is a specification.

This invention relates to proportional scales adapted for use by stair-builders, architects, builders generally, and engineers.

The primary object of the invention is to provide a proportional scale having independent divisions designating variations in the height or perpendicular extent of stair risers, that may be readily determined by the application of a measuring instrument with relation to a given distance and used as a scale one inch per foot and whereby the dimensions or height and number of risers within the given distance may be readily and accurately ascertained.

The invention consists in the arrangement and combination of a proportional scale having sections varying as to divisions or spaces representing specific fractions of one inch to obtain, in conjunction with a measuring instrument, the number of risers required within a given distance having a particular or desired perpendicular extent.

The drawing illustrates in plan view a proportional scale embodying the features of the invention.

The proportional scale embodying the features of the invention comprises four sections, 1, 2, 3, 4, suitably applied on a base 5 which may be flexible or rigid and terminally intersect each other to form a rectangular scale embodying means in the aggregate for obtaining at least four different measurements and quantities with relation to risers for stair-building or other uses to which the scale may be applicable. The several sections 1, 2, 3 and 4 are arranged in rectangular form and intersect each other to provide an inner space free of markings or inscriptions to provide inner clearance means particularly adjacent to the inner straight edges of the scales or sections to avoid the least interference with the accurate application of a rule to the said inner straight edges of the sections. A further advantage in arranging the sections in rectangular form is to render them conveniently accessible and adjacent so that computations may be easily made in relation to any one of the sections or comparative calculations easily made in relation to two or more of the sections. Furthermore, by having the several scale sections in the same horizontal plane and intersecting each other at right angles to form a rectangle a rule may be readily shifted from one scale section to another and thus avoid the necessity of picking up or raising the rule from the surface of the proportional scale as an entirety and thus materially expedite the operator in ascertaining the measurement desired. The section 1, for instance, is divided into a plurality of spaces representing quarter-inches and numbered consecutively from "1" to "49"; the section 2 is divided into spaces representing seven-twelfths of an inch and numbered from "1" to "35"; the section 3 is divided into spaces representing five-twelfths of an inch and numbered from "1" to "29", and the section 4 is divided into spaces representing three-quarters of an inch and numbered from "1" to "27". The actual dimensions are not, of course, shown in connection with the several spaces of the sections, as it would be impossible to embody such measurements in the drawing and practically illustrate the complete scale. It will also be understood that these space measurements may be modified and the number increased or decreased.

In the use of the scale an ordinary rule or other instrument, which can be used as a scale of one inch per foot, is disposed on the proportional scale with the figures which correspond to the space or distance to be divided touching the inner line of the section to be used or embodying the required number of divisions in accordance with a particular measurement in view and with the end of the rule touching or coinciding with the inner line of the scale space from which the divisions are numbered. With the rule in this position, the required dimensions will be shown in full on the rule at the point where the said rule crosses a line extended from the space or division "12". For example, if the stairway for a twenty-foot story is to be measured, twenty inches on the rule corresponds to the measurement of the story as specified, and thirty-four divisions on the scale, for instance as indicated by section 2, will indicate the number of risers required in the stairway, and the line of the division or space 12 intersecting the rule will give in inches the height of the risers when calculated from the end of the rule disposed at the beginning of the scale used.

What is claimed is:

A proportional scale for use in stair-building, consisting of a horizontally flat base with a plurality of scale sections thereon in the same horizontal plane and terminally intersecting at right angles to form an aggregate scale of rectangular contour and inclosing an inner clear space to render the inner straight edges of the scale sections clear for the application of a foot-rule thereto, each scale section being divided to designate the number of risers having a particular perpendicular extent and corresponding to a given height of a support of a building, each of the scale sections also being divided into spaces of uniform length without subdivisions and the spaces representing solely one kind of fractional division of an inch, the spaces of all of the sections being consecutively numbered and the spaces of each section differing as to length from the spaces of the remaining sections and the number of spaces in each section also differing from that of the other sections.

In testimony whereof I have hereunto set my hand in presence of two subscribing witnesses.

NELSON M. BLAIR.

Witnesses:
W. H. COOK,
ROBERT WATERMAN.